Sept. 8, 1964   L. R. BLAKE   3,147,711
LAMINATIONS AND LAMINATED STRUCTURES SUITABLE
FOR USE IN ELECTRICAL APPARATUS
Filed Feb. 17, 1961   2 Sheets-Sheet 1
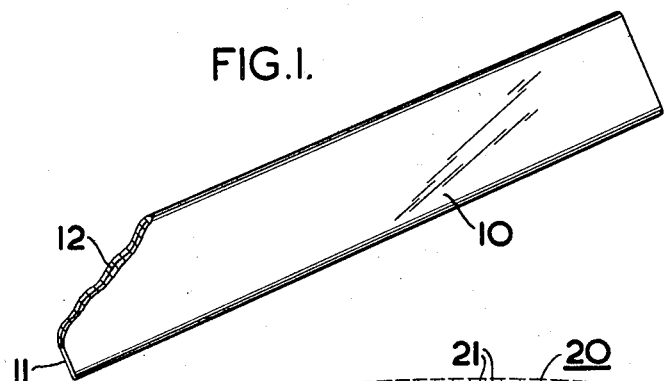
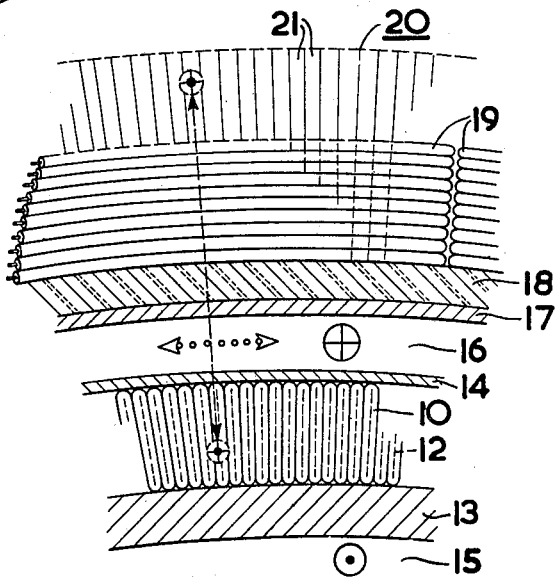
*Legends*
⊕   Alternating magnetic flux flow up and down.
⊙   Liquid metal flow up.
⊕   Liquid metal flow down.
⊲∘∘∘▷   Alternating induced current flow.
◄——►   Alternating magnetic flux flow.

United States Patent Office 3,147,711
Patented Sept. 8, 1964

3,147,711
LAMINATIONS AND LAMINATED STRUCTURES
SUITABLE FOR USE IN ELECTRICAL APPARATUS
Leslie Reginald Blake, Thurso, Caithness, Scotland, assignor to United Kingdom Atomic Energy Authority, London, England
Filed Feb. 17, 1961, Ser. No. 89,983
Claims priority, application Great Britain Feb. 17, 1960
3 Claims. (Cl. 103—1)

This invention relates to laminations and laminated structures suitable for use in electrical apparatus to provide a low reluctance magnetic flux path in one direction and a high impedance current path in a transverse direction.

The invention has arisen in the course of investigation of a design for an electromagnetic induction pump for liquid metals. It has already been proposed that such a pump may be constructed having a flat channel for liquid metal flow (commonly referred to as the flat linear induction pump) or having an annular channel (commonly referred to as the annular linear induction pump). A further development to the annular pump is to arrange that it has a re-entrant flow system. This is conveniently referred to as a re-entrant annular linear induction pump. In both forms of annular linear induction pump it is possible to arrange that laminations which are free from electrical windings can form one side of the annular flow channel of the pump but the practicability of such an arrangement is in doubt as the liquid metal may attack the insulation between the laminations or otherwise cause a reduction of the effectiveness of the laminations.

A lamination according to the invention comprises a tube of magnetic material having an insulating inner surface, flattened longitudinally and end sealed. The insulated inner surface is preferably provided by an oxide coating or by the high temperature insulations commonly used for transformer sheet and known by the trade-names Imlac, Circorlin, Alcorlin, Magnite, etc.

A laminated structure according to the invention comprises a stack of laminations each comprising a tube of magnetic material having an insulating inner surface, flattened longitudinally and end sealed, and a covering for the stack to protect it against erosion by flowing liquid metal. The covering may be formed by a sealed tube. However, the sealing of this tube or covering is not essential; the tube could be made open to the liquid metal or even leak without disastrous effects so long as substantially static conditions of the instruding liquid metal pertain to prevent eroding flow taking place over the stack of laminations.

A structure according to the invention will now be described with reference to the accompanying drawings—

FIG. 1 is a perspective view of a single lamination;

FIG. 2 is a sectional view of a laminated structure shown in combination with part of a re-entrant annular linear induction pump.

Figure 3:
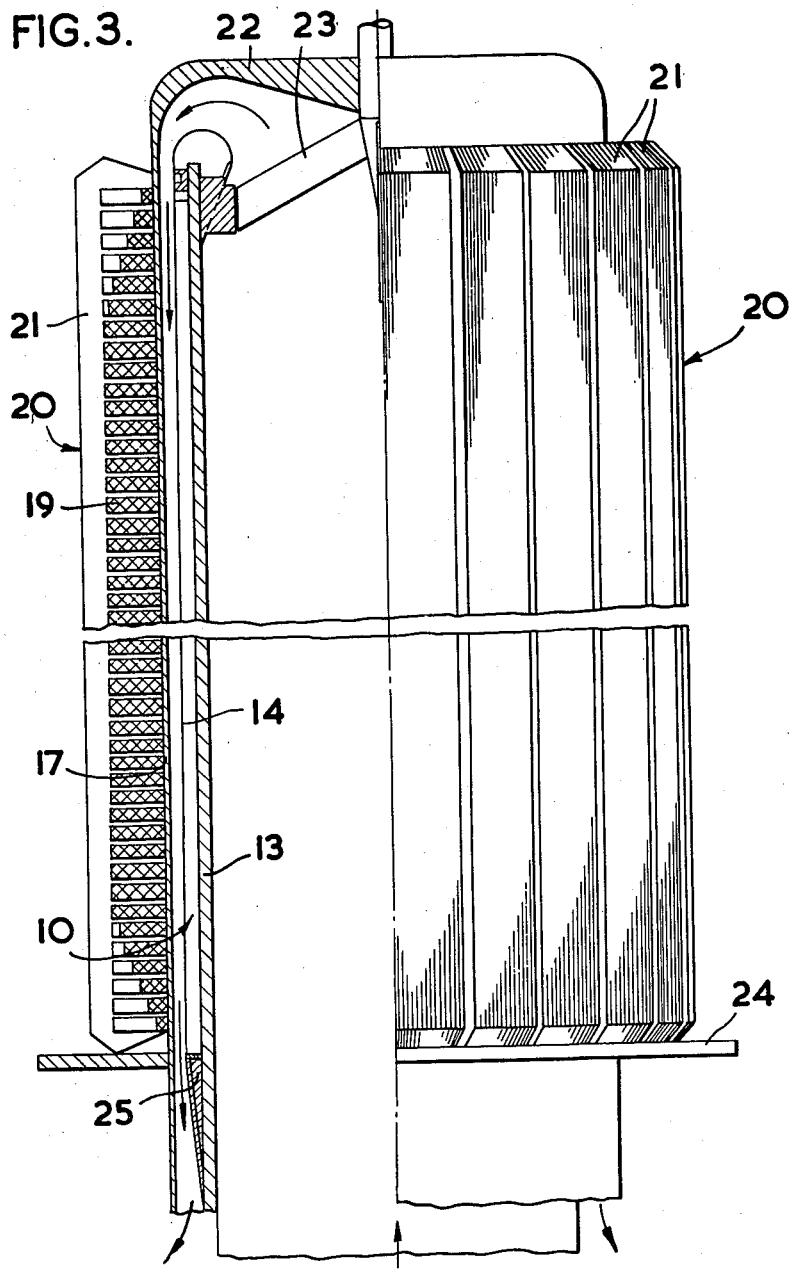
FIG. 3 is an elevational view, half in section, of the pump partly shown in FIG. 2.

In FIG. 1 there is shown a low alloy ferritic steel tube 10 of uniform diameter which has been flattened longitudinally and end sealed by welds 11 to form a lamination of elongated rectangular outline. The desirable features of the flattened tube are high magnetic permeability and saturation flux density and high electrical resistivity, the tube being resistant to the liquid metal, such as sodium or an alloy of sodium and potassium, to be used in the pump. Good ductility is also required so that the round tube is readily flattened without danger of fracturing at the edges. These features are met with a low-alloy ferritic steel, such as one having 1–3% chromium content. The tube 10 has an inner insulating surface 12 constituted by an oxide coating which in the flattened product becomes interposed uniformly between the overlying layers of the tube material. Such a coating is quickly formed by furnace heating. Typically the tube may be 10 feet long, have a wall thickness of 0.03 inch and a flattened width of 0.875 inch.

In FIG. 2 a series of flattened tubes 10 are shown stacked together in an annulus defined by a tube 13 and a protecting tube 14 which are part of a re-entrant annular linear induction pump having an inner non-pumping channel 15 defined by the tube 13, and an annular pumping channel 16 defined by the tube 14 and a tube 17. The tube 17 is covered with heat insulating material 18 which may be dispensed with according to the temperature of operation of the pump and type of electrical insulation used.

The tube 17 has a closed top 22, as best seen in FIG. 3, so as to resemble an inverted pot, there being a centering spider 23 internally of the closed top. Energising coils 19 are wound in slots provided by a core 20 which is composed of packs of comb-like laminations 21 carried by and extending longitudinally of the tube 17. The coils are flat and graded in radial width at the end sections of the tube. In known manner, the coils are arranged for connection to a multi-phase supply such as a sinusoidally varying magnetic field set up by the coils over the length of the pump moves in an axial direction and thereby induces circumferentially flowing electric current in liquid metal in the pumping channel 16. The interaction of this current with the radial magnetic flux produces directly an axial pressure in the liquid metal in the pumping channel. This flow pattern is indicated in FIG. 2 by symbols explained in the associated legend.

Further components of the pump illustrated in FIG. 3 are a mounting flange 24 and an outlet diffuser section 25.

Previous proposals for preventing erosion of the laminated structure in pumps of the kind illustrated is obtained by encasing the laminations in packs. With the present invention, the insulation is contained in a sealed manner within the laminations themselves and the tube defining the associated channel wall suffices alone for their protection, even though this tube may not be entirely leak-proof in service.

I claim:
1. In electrical apparatus, a laminated structure comprising a series of overlying layers of magnetic material forming a stack of generally rectilinear outline with the layers united integrally in pairs along one pair of opposing sides of said stack, electrical insulation of lesser thickness than said layers interposed uniformly and continuously between the layers of each of said pairs, and a covering sealingly enclosing said stack.

2. In electrical apparatus, a laminated structure comprising a series of overlying layers of magnetic material forming a stack of generally rectilinear outline with the layers united integrally in pairs along one pair of opposing sides of said stack, electrical insulation of lesser thickness than said layers interposed uniformly and continuously between the layers of each said pairs, sealing joints extending in respect of each of said pairs of layers along the line of the interface at the other pair of opposite sides of said stack, and a covering enclosing said stack to an extent sufficient at least to give substantially static conditions of fluid finding its way into the interior of said covering from an external flow of said fluid.

3. In a linear induction pump for liquid metals having walls defining between them a pumping channel and respectively associated with said walls outside said pumping channel a laminated structure with energising windings and a laminated structure without energising windings, the construction whereby the second-mentioned laminated structure comprises a series of overlying layers of magnetic material forming a stack of generally rectilinear outline with the layers united integrally in pairs along one pair of opposing sides of said stack, electrical insulation of lesser thickness than said layers interposed uniformly and continuously between the layers of each of said pairs, and sealing joints extending in respect of each of said pairs of layers along the line of the interface at the other pair of opposite sides of said stack.

References Cited in the file of this patent

UNITED STATES PATENTS

| | | |
|---|---|---|
| 2,103,271 | Pratt | Dec. 28, 1937 |
| 2,453,165 | Thornburgh | Nov. 9, 1948 |
| 2,522,780 | Dickson | Sept. 19, 1950 |
| 2,686,474 | Pulley | Aug. 17, 1954 |
| 2,733,502 | Van Leer et al. | Feb. 7, 1956 |
| 2,913,603 | Carlson | Nov. 17, 1959 |
| 2,987,001 | Blake | June 6, 1961 |
| 3,061,924 | Brick et al. | Nov. 6, 1962 |

FOREIGN PATENTS

| | | |
|---|---|---|
| 779,545 | Great Britain | July 24, 1957 |
| 839,824 | Great Britain | June 29, 1960 |